(12) United States Patent
Gustafson et al.

(10) Patent No.: US 10,078,664 B2
(45) Date of Patent: Sep. 18, 2018

(54) SEARCHING FOR AND FINDING DATA ACROSS INDUSTRIAL TIME SERIES DATA

(71) Applicant: General Electric Company, Schenectady, NY (US)

(72) Inventors: Steven Matt Gustafson, Niskayuna, NY (US); Abha Moitra, Scotia, NY (US); Kareem Sherif Aggour, Niskayuna, NY (US); Luis Babaji Ng Tari, Glenville, NY (US); Aisha Yousuf, Niskayuna, NY (US)

(73) Assignee: General Electric Company

( * ) Notice: Subject to any disclaimer, the term of this patent is extended or adjusted under 35 U.S.C. 154(b) by 271 days.

(21) Appl. No.: 14/733,693

(22) Filed: Jun. 8, 2015

(65) Prior Publication Data

US 2016/0162543 A1 Jun. 9, 2016

Related U.S. Application Data

(60) Provisional application No. 62/088,328, filed on Dec. 5, 2014.

(51) Int. Cl.
*G06F 17/30* (2006.01)
*G06Q 50/00* (2012.01)

(52) U.S. Cl.
CPC .. *G06F 17/30448* (2013.01); *G06F 17/30353* (2013.01); *G06F 17/30477* (2013.01); *G06F 17/30548* (2013.01); *G06Q 50/00* (2013.01)

(58) Field of Classification Search
CPC ......... G06F 17/30448; G06F 17/30353; G06F 17/30477
See application file for complete search history.

(56) References Cited

U.S. PATENT DOCUMENTS

| 7,103,509 B2 | 9/2006 | Shah et al. |
| 7,330,818 B1 | 2/2008 | Ladocsi et al. |
| 7,512,553 B2 | 3/2009 | Chidiac et al. |

(Continued)

OTHER PUBLICATIONS

U.S. Appl. No. 14/788,526, Examiner Interview Summary dated Sep. 1, 2017, 3 pgs.

(Continued)

*Primary Examiner* — Loc Tran
(74) *Attorney, Agent, or Firm* — Buckley, Maschoff & Talwalkar

(57) ABSTRACT

A system and method for searching for and finding data across industrial time-series data is disclosed. A computer system receives a search query from a client system. The computer system accesses a database including a plurality of stored time-series data sets. For each stored time-series data set, the computer system determines whether the stored time-series data set includes one or more sections that match the received search query. In accordance with a determination that two or more of stored time-series data sets include at least one section that matches the received search query, the computer system determines whether the matching sections in each stored time-series data set have overlapping time periods. In accordance with a determination that the matching sections in each time-series data set have overlapping time periods, the computer system identifies a particular event that occurred during the overlapping time periods.

15 Claims, 15 Drawing Sheets

(56) References Cited

U.S. PATENT DOCUMENTS

| | | |
|---|---|---|
| 8,340,436 B2 | 12/2012 | Das et al. |
| 8,730,242 B2 | 5/2014 | Hao et al. |
| 2003/0093246 A1* | 5/2003 | Daw .................. B01D 1/0058 702/188 |
| 2005/0125311 A1 | 6/2005 | Chidiac et al. |
| 2006/0111857 A1 | 5/2006 | Shah et al. |
| 2008/0033991 A1 | 2/2008 | Basak et al. |
| 2009/0049026 A1* | 2/2009 | Ohguro ............. G06F 17/30669 |
| 2014/0278241 A1 | 9/2014 | Jiang et al. |
| 2015/0213631 A1* | 7/2015 | Vander Broek ....... G06T 11/206 345/589 |
| 2016/0055280 A1 | 2/2016 | Devoy et al. |
| 2016/0161375 A1 | 6/2016 | Harpale et al. |

OTHER PUBLICATIONS

U.S. Appl. No. 14/788,526, Final Office Action dated Nov. 3, 2017, 18 pgs.

U.S. Appl. No. 14/788,526, Non Final Office Action dated Jul. 17, 2017, 7 pgs.

U.S. Appl. No. 14/788,526, Response filed Aug. 30, 2017 to Non Final Office Action dated Jul. 17, 2017, 10 pgs.

U.S. Appl. No. 14/788,526, filed Jun. 30, 2015, Text-Mining Approach for Diagnostics and Prognostacs Using Temporal Multi-Dimensional Sesnor Observations.

\* cited by examiner

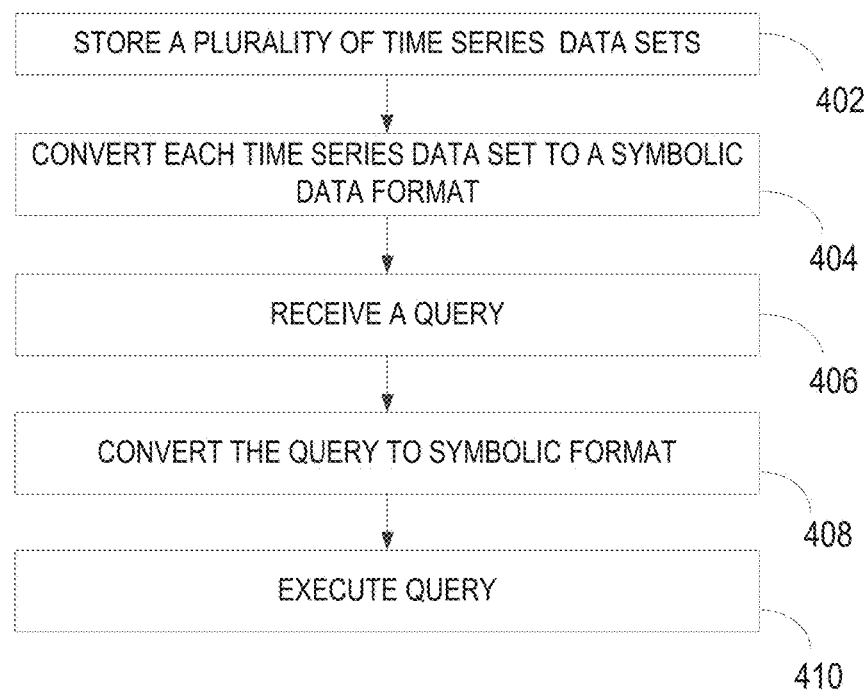
FIGURE 4       400

SEARCH QUERY: BC

602

SYMBOLIC DATA:

604

SET 1: ABCCBCEDDCAABACCCDCDCAABCEDDDEEDBACAEDCBAECBACDBCADBBCEBCADBACED
SET 2: BDECAACABCEDCCCAADEEBABCAACCAAADBADCADDAEBCAADDAEBAECADCBACEE
SET 3: CEEEDBCEDEEDDBEBCEACEBEEDDCDABCEDCEACDABCEDBEACDBAECDBACDBCEECEEE
SET 4: DEEAABCEDAECCCDDDAAEBBAAEACBAAEBDCABECABECDBCEDEABECABECDBCAECBD

SEARCH QUERY: BCE
602

SYMBOLIC DATA:
604

SET 1: ABCCBCEDDCAABACCCDCDCAABCEDDEEDBACAEDCBAECBACDBCADBBCEBCADBACED
SET 2: BDECAACABCEDCCCCAADEEBABCAACAAADBADCADDAEBCEAEBCDAEBAECADCBACEE
SET 3: CEEEDBCEDBEEDDBEBCEACEBEEDDDCDABCEDCEACDABCDBEACDBAECDBACDBCECEEE
SET 4: DEEAABCEDAECCCDDDAAEBBAAEACBAAEBDCABECDBCEDEABECDBCEABCAECBD
608

FIGURE 6B

SEARCH QUERY: BCED

SYMBOLIC DATA: ─── 604

SET 1: ABCCBCEDDCAABACCCDCDCAABCEDDDEEDBACAEDCBAECBACDBCADBACEBCADBACED
SET 2: BDECAACABCEDCCCAADEEBABCAACCAAADBADCADDAEBCDAEBAECADCBACEE
SET 3: CEEEDBCEDEEDDBEBCEACEBEEDDCDABCEDCEACDBEACDBAECDBECEEEE
SET 4: DEEAABCEDAECCDDDAAEBBAAEACBAAEBDCABECDBCEDEABECDDEABCAECBD
                          └─ 610

FIGURE 6C

SEARCHING FOR AND FINDING DATA ACROSS INDUSTRIAL TIME SERIES DATA

CROSS-REFERENCE TO RELATED APPLICATIONS

This application claims the benefit of priority to U.S. Provisional Patent Application entitled "Systems and Methods for Search and Find Across Industrial Time Series Data," Ser. No. 62/088,328, filed Dec. 5, 2014, which is hereby incorporated herein by reference in its entirety.

TECHNICAL FIELD

The disclosed embodiments relate generally to data management and in particular to efficient searching in time series data.

BACKGROUND

The rise in electronic and digital device technology has rapidly changed the way society interacts with media and consumes goods and services. Digital technology enables a variety of consumer devices to be available that are very flexible and relatively cheap. Modern electronic devices, such as personal computers, smart phones, tablets, and other personal electronic devices, allow significant amounts of data to be captured in large amounts.

One type of data that can be captured is time series data, which is data that records changes in a variable or system over time. For example, a sensor in a wearable electronic device measures a user's heart rate and stores the heartbeat data with accompanying time data. In some cases, data gathered and stored in this way can be difficult to efficiently search.

DESCRIPTION OF THE DRAWINGS

Some embodiments are illustrated by way of example and not limitation in the figures of the accompanying drawings, in which:

FIG. 4 is a flow diagram illustrating a method, in accordance with an example embodiment, for efficient searching of large sets of time series data.

FIGS. 6A-6D are diagrams illustrating a process, in accordance with some example embodiments, of using symbolic values to identify specific patterns in symbolic data based on a received search query.

Like reference numerals refer to corresponding parts throughout the drawings.

DETAILED DESCRIPTION

Figure 1:
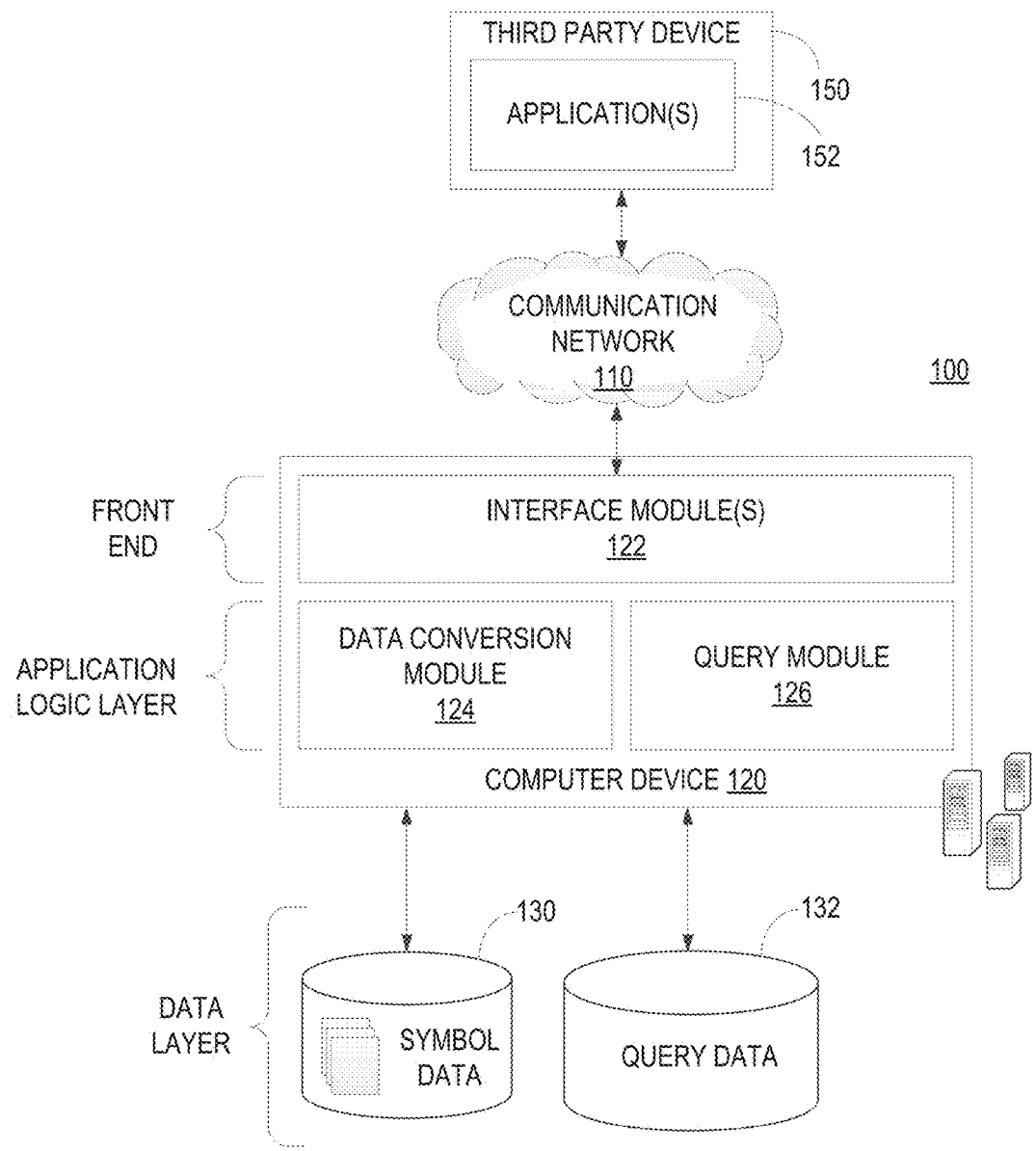
FIG. 1 is a network diagram depicting a computer device, in accordance with an example embodiment, that includes various functional components.

The present disclosure describes methods, systems, and computer program products for efficient searching of multiple large sets of time series data. In the following description, for purposes of explanation, numerous specific details are set forth to provide a thorough understanding of the various aspects of different embodiments. It will be evident, however, to one skilled in the art, that any particular embodiment may be practiced without all of the specific details and/or with variations, permutations and combinations of the various features and elements described herein.

Large amounts of data may be difficult to efficiently store and search. This can be especially true of large sets of time series data. Time series data includes any data that represents a value or set of values that change with time and are stored with specific times associated with one or more sections of the data. In some example embodiments, a single system (e.g., an engine) includes multiple sensors that track different variables about the system over time. These multiple sensors produce multiple data sets that are distinct from each other, but related. For example, an engine has a first time-series data set that measures the temperature of the engine, a second time-series data set that measures the number of revolutions per second that the engine is making, and a third time-series data set that measures the amount of fuel used. These time series data sets are distinct but related and thus may include similar patterns. However, searching the time series data to find common patterns is very difficult due to the amount of data collected and the differences in the data.

In some example embodiments, one solution to this problem is to convert each time-series data set into a format that is easier to search. Once converted, the data can be searched with advanced searching algorithms and tools such as pattern matching (e.g., regular expressions).

In some example embodiments, each time-series data is divided into discrete time units. In some example embodiments, the time units are predetermined and fixed (e.g., 1 second worth of data in each unit). In other example embodiments, the time units are generated based on the data represented (e.g., larger time units may suffice for data that does not change quickly over time). Once the time-series data has been broken into discrete sections, the data in each time unit is aggregated (e.g., averaged), to produce an aggregate value for the respective time window. In some example embodiments, each aggregate value is grouped into one or more discrete grouping of the data. For example, if the data varied between 0 and 4, aggregates would be grouped for 0-1, 1-2, 2-3, and 3-4. Thus, any aggregate between 0 and 1 would be considered to be the same.

In some example embodiments, each data set is normalized such that all the values are between 0 and 1. In this way, two discrete data types (e.g., temperature and revolutions per second) can be compared. For example, the highest value is set to 1 and the lowest value is set to 0. In this way, the server system can determine when both values are in the high range of possible values or the low range and can thus compare distinct data sets.

In some example embodiments, the aggregate values are then converted to a single representative signal for its allotted group. For example, the letter A is assigned to aggregate values from 0 to 1, the letter B is assigned to aggregate values from 1 to 2, the letter C is assigned to aggregate values from 2 to 3, and the letter D is assigned to aggregate values from 3 to 4. The entire time series set can thus be represented as a string of the characters A, B, C, and D.

In some example embodiments, the string of representative characters can be searched. In some example embodiments, a search query is received. The query is then processed to conform to the system of representative symbols. Once the query has been converted, a textual search of the time-series dataset can be accomplished and the search results can be returned to the requesting system.

In some example embodiments, the search identifies one or more sections that match the received search query. The computer device then determines whether the identified sections in the distinct time-series datasets take place at the same time (or near the same time). To do so, the computer device uses the time data associated with each time-series data set to determine a start time for the matching section and an end time for the matching section of each time-series data set.

The computer device compares the start and end time for identified matching sections of each time series data set to determine whether each identified matching section overlaps in time (or nearly overlaps). In accordance with a determination that each identified matching section overlaps with the identified matching sections from the other time-series data set, the computer device identifies the period of time in which the identified matching sections occurred as the section of time in which an event associated with the search query occurred.

FIG. 1 is a network diagram depicting a computer device 120, in accordance with an example embodiment, that includes various functional components. In some example embodiments, the computer device 120 is part of a client-server system 100 that includes the computer device 120 and one or more third party devices 150. One or more communication networks 110 interconnect these components. The communication network 110 may be any of a variety of network types, including local area networks (LANs), wide area networks (WANs), wireless networks, wired networks, the Internet, personal area networks (PANs), or a combination of such networks.

In some embodiments, as shown in FIG. 1, the computer device 120 is generally based on a three-tiered architecture, consisting of a front-end layer, an application logic layer, and a data layer. As is understood by skilled artisans in the relevant computer and Internet-related arts, each module or engine shown in FIG. 1 represents a set of executable software instructions and the corresponding hardware (e.g., memory and processor) for executing the instructions. To avoid unnecessary detail, various functional modules and engines that are not germane to conveying an understanding of the various embodiments have been omitted from FIG. 1. However, a skilled artisan will readily recognize that various additional functional modules and engines may be used with a computer device 120, such as that illustrated in FIG. 1, to facilitate additional functionality that is not specifically described herein. Furthermore, the various functional modules and engines depicted in FIG. 1 may reside on a single server computer, or may be distributed across several server computers in various arrangements. Moreover, although the computer device 120 is depicted in FIG. 1 as having a three-tiered architecture, the various embodiments are by no means limited to this architecture.

As shown in FIG. 1, the front-end layer consists of an interface module 122, which receives input from a user through one or more input systems (e.g., a touch screen, keyboard, mouse or other means of receiving input including receiving input through a communication network 110), and relay responses back to the current user.

As shown in FIG. 1, the data layer includes one or more databases, including databases for storing data associated with and used by the computer device 120, including symbol data 130 and query data 132.

In some embodiments, symbol data 130 includes data used to convert time-series data (or their aggregates) into one or more symbols appropriate to the time-series data set. In some example embodiments, the query data 132 includes data used to convert queries into a form that can be used to search through the symbol data 130 created by the data conversion module 124.

In some example embodiments, the computer device 120 provides a broad range of other applications and services that allow users the opportunity to share and receive information, often customized to the interests of the users.

In some embodiments, the application logic layer includes various application server modules, which, in conjunction with the user interface module(s) 122, generate various user interfaces to receive input from and deliver output to a user. In some embodiments, individual application modules are used to implement the functionality associated with various applications, services, and features of the computer device 120. One or more applications or services that utilize a data conversion module 124 and a query module 126 may be separately implemented in their own application modules.

In addition to the various application server modules, the application logic layer includes a data conversion module 124 and a query module 126. As illustrated in FIG. 1, in some embodiments, the data conversion module 124 and the query module 126 are implemented as modules that operate in conjunction with various application modules. For instance, any number of individual application modules can invoke the functionality of the data conversion module 124 and the query module 126 to convert data and queries for efficient searching. However, in various alternative embodiments, the data conversion module 124 and the query module 126 may be implemented as their own application modules such that they operate as a stand-alone application.

In some example embodiments, the data conversion module 124 accesses a set of time-series data (e.g., accesses it in memory or receives it over a communication network 110). In some example embodiments, the data conversion module 124 normalizes the data for each time-series data set. In some example embodiments, the data conversion module 124 divides the time-series data into one or more segments (e.g., by time intervals). In some example embodiments, the data conversion module 124 generates an average value for each time segment in the one or more time segments.

In some example embodiments, the data conversion module 124 substitutes the average value for each time segment with a representative symbol based on the symbol data 130. In some example embodiments, the average data is first group into one of several discrete groups (e.g., all averages grouped into one of 10 value ranges) and then a symbol (e.g., a letter such as "a" or "b") is assigned to each of the discrete groups.

In some example embodiments, the query module 126 receives a query (e.g., generated internally to the computer device 120 or received from a third party device 150 over the communication network 110). In some example embodiments, the query indicate a plurality of time-series data sets to search. In some example embodiments, the search query indicates a system to analyze and a period of time. In response, the computer device 120 retrieves all time-series data sets for the indicated system for the time periods indicated. For example, a query indicates a set of gas turbines during 6 am to 6 pm. The computer device 120 retrieves a plurality of time-series data sets associated with the set of gas turbines.

The received query does not reference the symbols that now are used to represent the time-series data. The query module 126 converts the query to a form that can be used to search the symbol data 130 converted to time-series data. This conversion is made based on query data 132.

In some example embodiments, the query module 126 then matches the received query against the identified one or more time-series data sets. Because both the time series data set and the query have been converted to symbolic form, the query module 126 is able to use text search innovations including operators such as Boolean, phrase, span, wildcard, and range. In addition, while older methods require the search string to be the same size as the matched pattern, the query module 126 and our approach works around that by using wildcards such that a plurality of length can be matched to a single pattern with wildcards.

In some example embodiments, once a matching section is identified in one or more of the distinct time-series data sets, the query module 126 determines whether the matching sections occurred during the same time period. If so, the query module 126 determines that the identified sections are related to the same event and thus that an event has been identified. In some example embodiments, the search query is based on expected measurements for a specific event. For example, if a user wants to find a quick start up of a turbine in a time series, the query module 126 will search for patterns that could indicate a quick start up. Then if all (or most) of the data sets show a matching section during the same time period the query module 126 will determine that a quick start up occurred during that time period.

In some example embodiments, a third party device 150 is able to connect a user to the computer system 120 through a network 110. The third party device 150 includes one or more applications 152.

Figure 2:
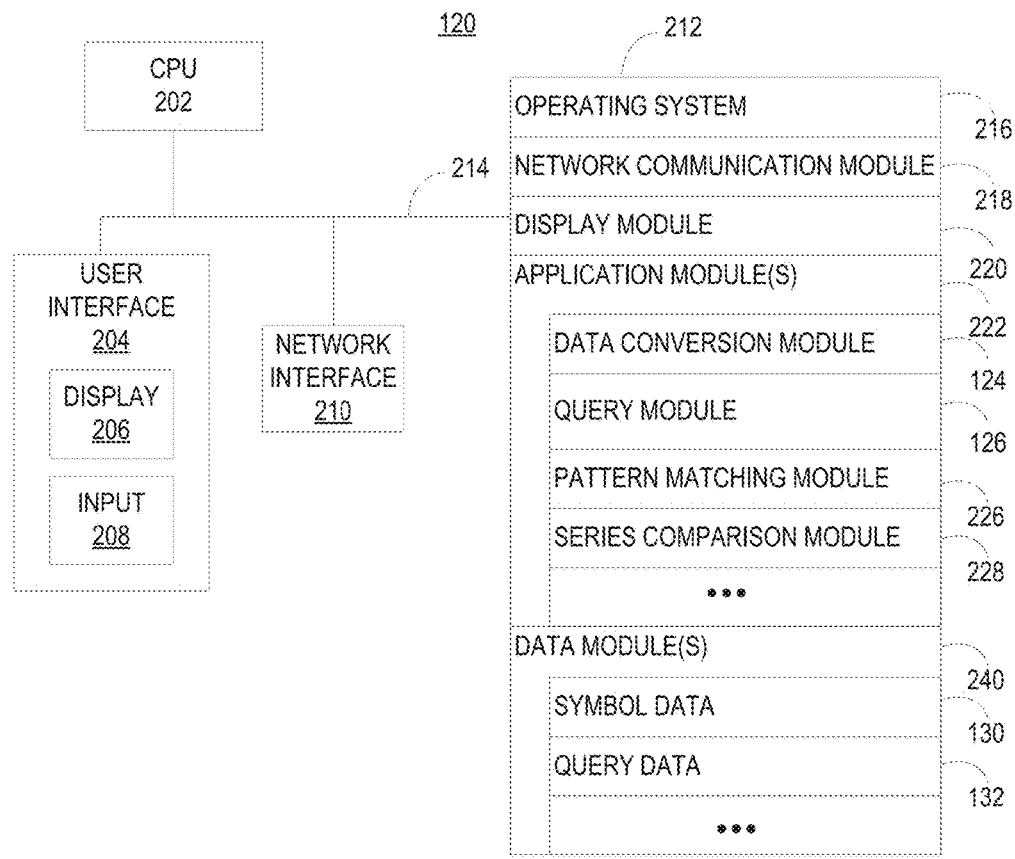
FIG. 2 is a block diagram illustrating a computer device, in accordance with an example embodiment.

FIG. 2 is a block diagram illustrating a computer device 120, in accordance with an example embodiment. The computer device 120 typically includes one or more processing units (CPU's) 202, one or more network interfaces 210, a memory 212, and one or more communication buses 214 for interconnecting these components. The computer device 120 includes a user interface 204. The user interface 204 includes a display 206 and optionally includes an input 208, such as a keyboard, mouse, touch-sensitive display, or other input means. Furthermore, some computer devices 120 use a microphone and voice recognition to supplement or replace the keyboard.

Memory 212 includes high-speed random-access memory, such as dynamic random-access memory (DRAM), static random-access memory (SRAM), double data rate random-access memory (DDR RAM), or other random-access solid-state memory devices, and may include non-volatile memory, such as one or more magnetic disk storage devices, optical disk storage devices, flash memory devices, or other non-volatile solid-state storage devices. Memory 212 may optionally include one or more storage devices remotely located from the CPU(s) 202. Memory 212, or alternately, the non-volatile memory device(s) within memory 212, comprise(s) a non-transitory computer readable storage medium.

In some embodiments, memory 212 or the computer readable storage medium of memory 212 stores the following programs, modules, and data structures, or a subset thereof:

- an operating system 216 that includes procedures for handling various basic system services and for performing hardware dependent tasks;
- a network communication module 218 that is used for connecting the computer device 120 to other computers via the one or more network interfaces 210 (wired or wireless) and one or more communication networks 110, such as the Internet, other wide area networks, local area networks, metropolitan area networks, etc.;
- a display module 220 for enabling the information generated by the operating system 216 and application modules 222 to be presented visually on the display 206;
- one or more application modules 222 for handling various aspects of providing the services associated with the computer device 120, including but not limited to:
  - a data conversion module 124 for converting data from a time-series representation to a symbolic representation;
  - a query module 126 for modifying a received query to enable the converted data set to be searched quickly and efficiently;
  - a pattern matching module 226 for recognizing patterns within text to determine whether the text matches (in whole or in part) a received query; and
  - a series comparison module 228 for determining whether a first time-series and a second time-series include one or more patterns in common based on the value data and the corresponding time values; and
- a data module 240, for storing data relevant to the computer device 120, including but not limited to:
  - symbol data 130 for symbol data related to time series data stored on the computer device 120;
  - query data 132, including data related to queries that can be executed by the computer device 120

Figure 3:
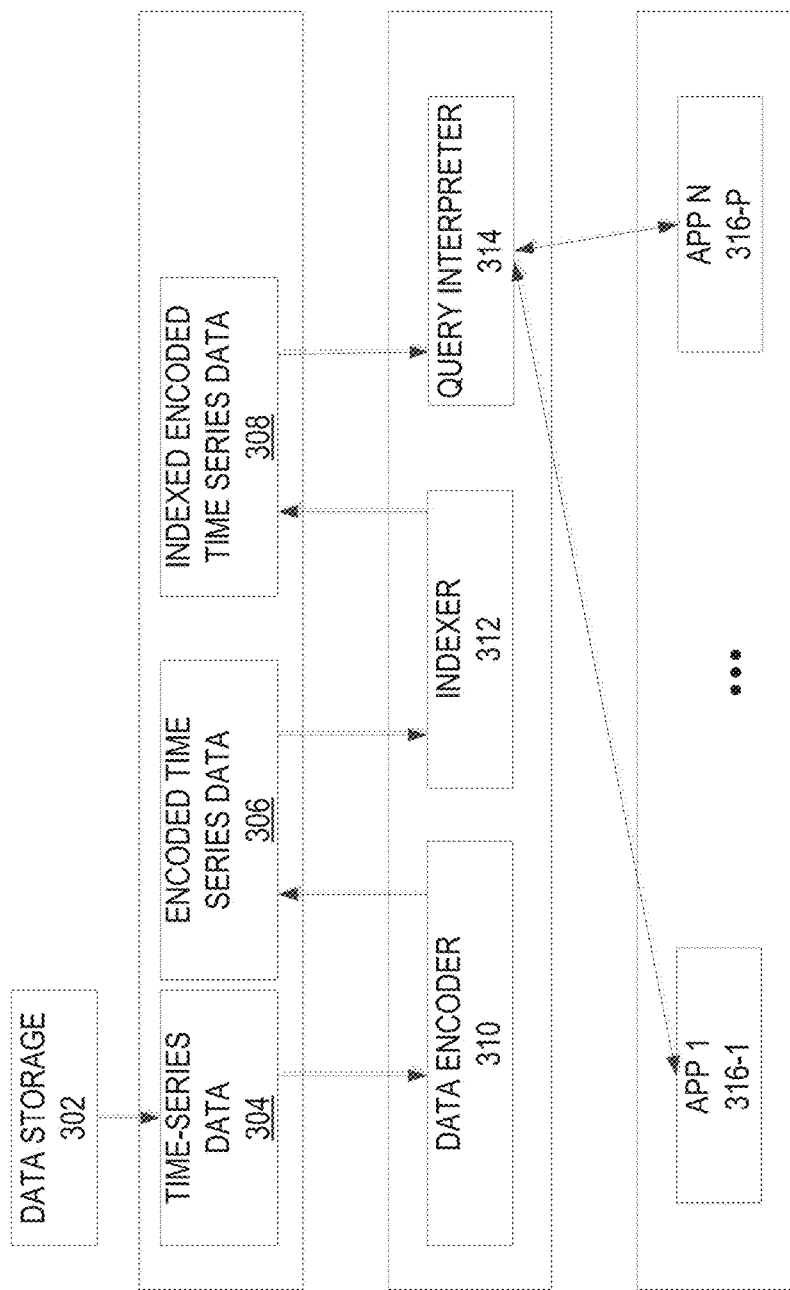
FIG. 3 is a block diagram illustrating a computer device, in accordance with an example embodiment.

FIG. 3 illustrates a block diagram of a computer system (e.g., the computer system 120 in FIG. 1). In some example embodiments, the computer system (e.g., the system 120 in FIG. 1) includes data storage 302 (or the computer system (e.g., the system 120 in FIG. 1) can access data storage 302 remotely). The data storage 302 includes one or more sets of time-series data.

In some example embodiments, in response to a query, the computer system (e.g., the system 120 in FIG. 1) selects one or more sets of data that are responsive to the query and stores them in a time series data module 304 in local storage.

In some example embodiments, the data encoder 310 then encodes the time-series data 304 to find averages for one or more sections of the time-series data 304 and then assign symbols to those averages to produce a string of symbols that represent an entire time-series data set. The string of symbols is then stored in the encoded time series data 306.

In some example embodiments, an indexer 312 then indexes the encoded time series data 306 and stores it in the indexed encoded time series data 308. In some example embodiments, the query interpreter 314 receives one or more queries from one or more applications (316-1 to 316-P). The query interpreter 314 then converts the received queries into a format that can be used to search the encoded time-series data 306 (e.g., a regular expression using the symbols).

FIG. 4 is a flow diagram illustrating a method 400, in accordance with an example embodiment, for efficient searching of large sets of time series data. Each of the operations shown in FIG. 4 may correspond to instructions stored in a computer memory 212 or computer readable storage medium. In some embodiments, the method 400 described in FIG. 4 is performed by the computer device (e.g., the computer device 120 in FIG. 1).

In some embodiments, the method 400 is performed at a computer device (e.g., the computer device 120 in FIG. 1) including one or more processors and memory 212 storing one or more programs for execution by the one or more processors.

The computer device (e.g., the computer device 120 in FIG. 1) stores (402) data for a plurality of time series data sets. In some example embodiments, time series data is data that tracks variables in a system data as they change over time (e.g., a value or a position). In some example embodiments, this data is stored in a key-value pair with the time value as the key. In some example embodiments, a given system has multiple sensors that each tracks a distinct variable. Thus, the system is represented by a plurality of distinct but related time-series data sets. These sets can then be compared to product better analysis of the data.

In some example embodiments, the computer system (e.g., the system 120 in FIG. 1) converts (404) time series data for each time-series data set to a symbolic data format. In some example embodiments, the specific data series is selected based the information in a specific query. In other example embodiments, all the time series data is converted prior to any specific query. Thus, the data has all been converted to the symbolic form and thus will be ready for a query to be executed immediately. In some example embodiments, the query references multiple sets of time series data.

In some example embodiments, the computer system (e.g., the system 120 in FIG. 1) receives (406) a specific query. In some example embodiments, the query is received from a third party system. In some example embodiments, the query identifies a plurality of time-series data sets and an associated time frame.

In some example embodiments, the computer system (e.g., the system 120 in FIG. 1) converts (408) the received query to a format that uses the symbolic representation. In some example embodiments, the received search query is already formatted in the symbolic representation notation (e.g., the user entered the query using the symbolic representation notation.) in other example embodiments, the query is selected for a set of potential queries, each of which has a predetermined symbolic representation equivalent. For example, if there are 6 potential events to search for a given system, the user chooses an event to search for and the matching search query in symbolic representation notation is used.

In other example embodiments, a user can make a request in natural language or using the unconverted data points. In some example embodiments, the computer system (e.g., the computer system 120 in FIG. 1) analyzes the received search query and converts it to a symbolic representation notation pattern.

In some example embodiments, the computer system (e.g., the system 120 in FIG. 1) then executes (410) the search query. In some example embodiments, the query includes comparing more than one time series data set to identify one or more common patterns. In this case, the computer system (e.g., the system 120 in FIG. 1) matches common trends in the two or more data sets and then determines if they occurred near the same time. Thus, if similar patterns occur in more than one time series data set at the same approximate time, the computer system (e.g., the system 120 in FIG. 1) determines that the pattern is significant. In some example embodiments, the query results are then sent to the requesting user.

Figure 5A:
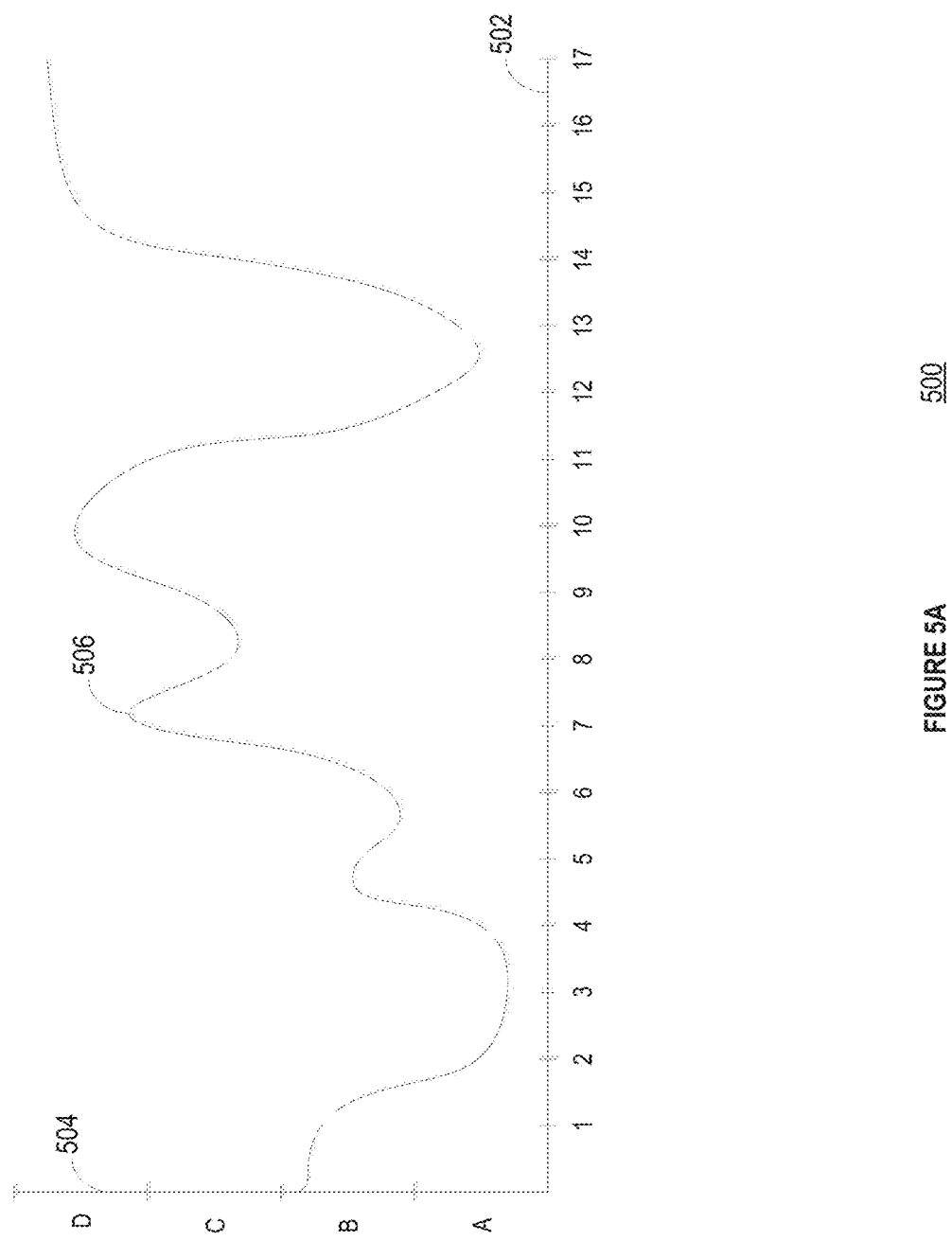
FIGS. 5A-5C are diagrams illustrating a process, in accordance with some example embodiments, of converting time series data into a symbolic data format.

FIG. 5A is a diagram 500 illustrating the process, in accordance with some example embodiments, of converting time series data into a symbolic data format. In this example, the value of the time series data is represented on a two dimensional graph.

In this example, the x-axis 502 represents the time (e.g., 0 seconds to 17 seconds. The Y-axis represents the value to be tracked 504 with values broken into four equal groups with associated symbols A-D. In some examples, the values range from 0 to 1 with 0.25 of range allocated to each symbol. In this example, the value of the variable is charted over time 506. This gives a visual representation of the value of the tracked variable over time.

Figure 5B:
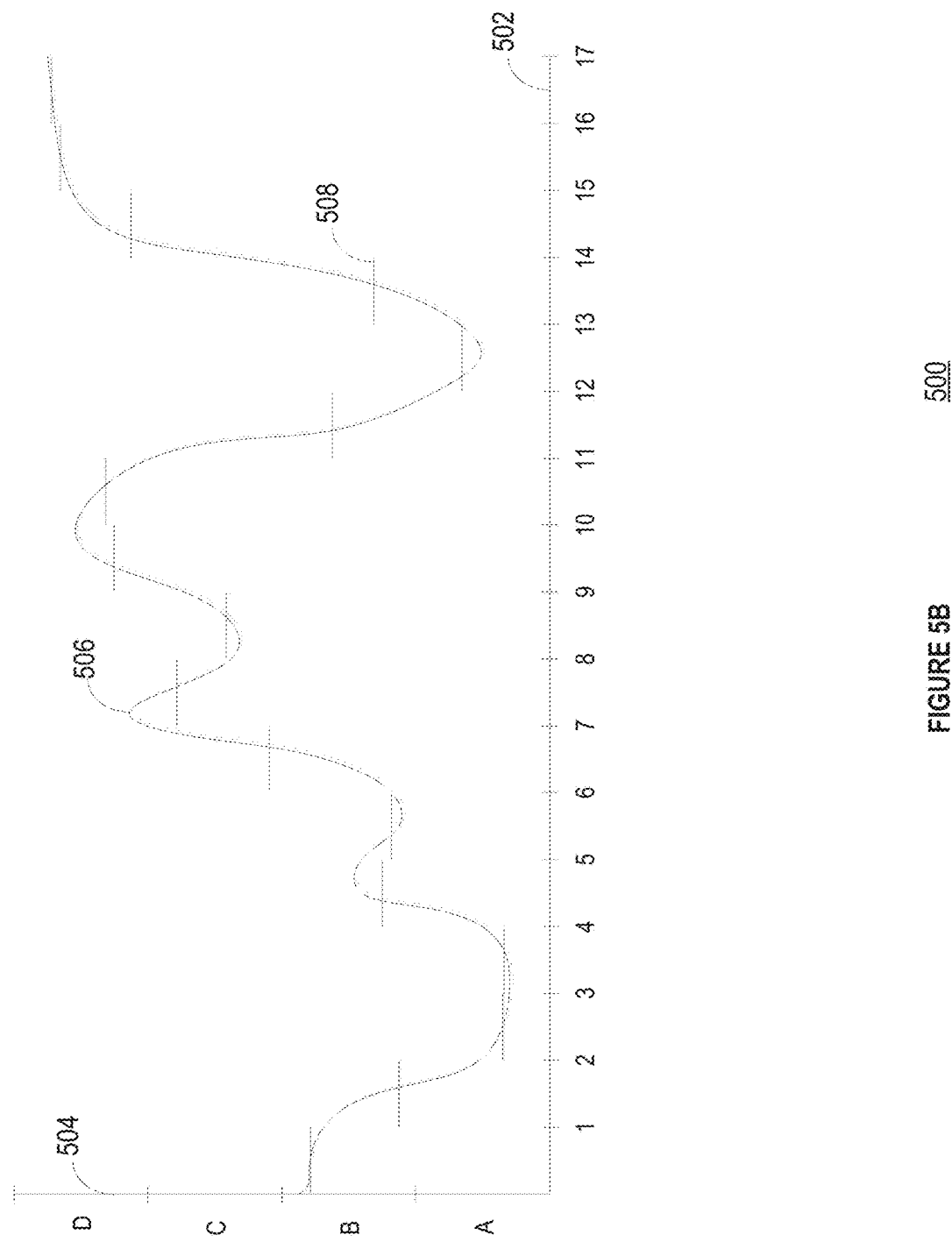

FIG. 5B is a block diagram 500 illustrating the process, in accordance with some example embodiments, of converting time series data into a symbolic data format. In this example, the graph has been broken down into one or more time value groups (e.g., buckets). The computer system 120 then generates an average value for each time value group. The average values are then displayed as a series of horizontal lines on the graph. For example, the average value for the time between 13 and 14 seconds is represented as a line (508) along the graph above the x-values for 13 seconds and the 14 seconds value of the time series data is represented on a two dimensional graph.

Figure 5C:
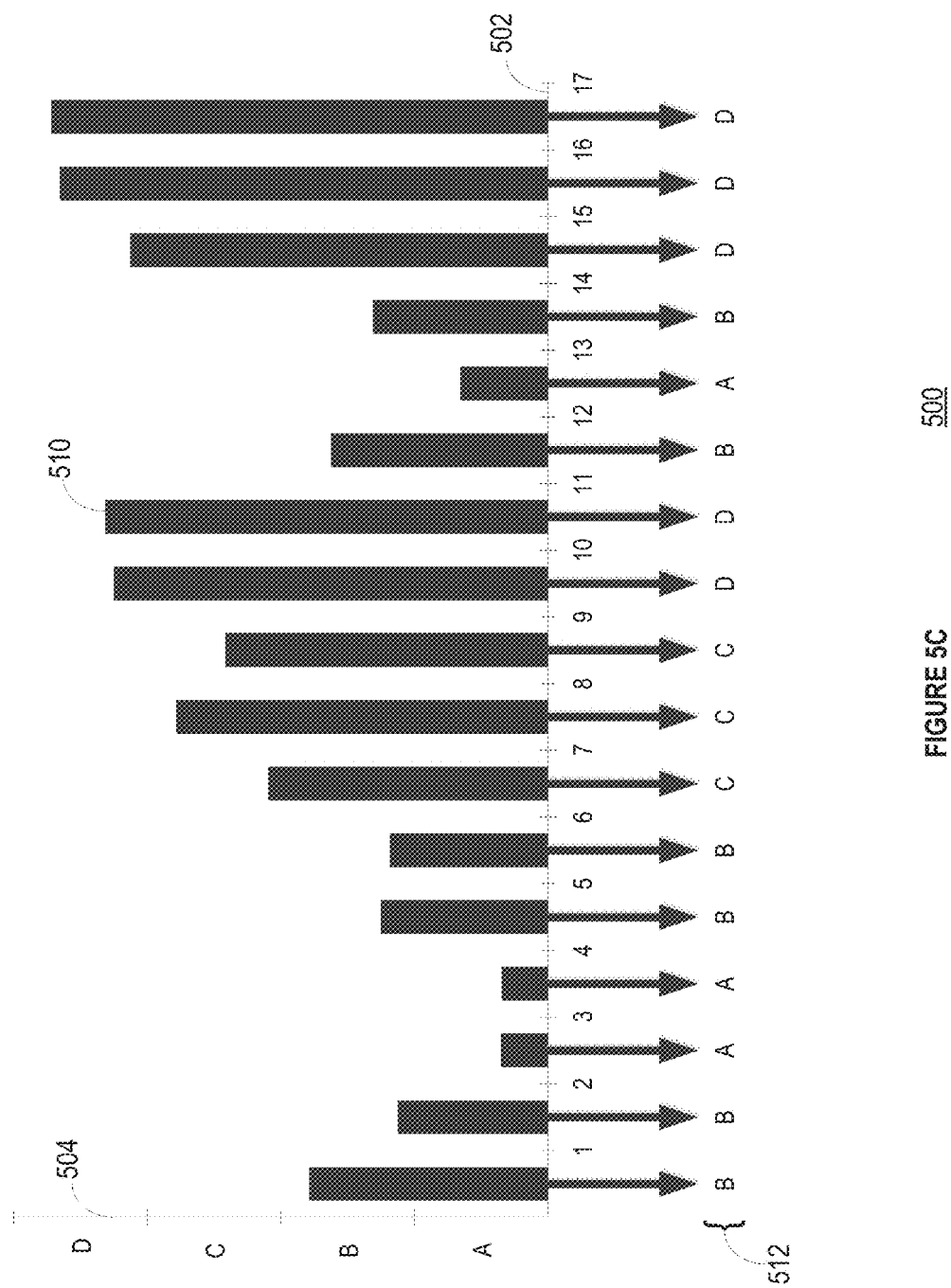

FIG. 5C is a block diagram illustrating the process, in accordance with some example embodiments, of converting time series data into a symbolic data format. In this example, the graph has been broken down into one or more time value groups (e.g., buckets). In some example embodiments, the computer system (e.g., the computer system 120 in FIG. 1) converts each average value into a representative symbolic value.

In this example, each time group (e.g., from 0 seconds to 1 second) has its average value represented by a bar of the height representing the average value. Each time group is then translated into a specific symbolic value for each time value group. The average values are then displayed as a series of bars on the graph. For example, the average value for the time between 10 and 11 seconds is represented as a line (510) along the graph above the x-values for 10 seconds and the 11 seconds.

In this example, the symbolic value 510 that is associated with each time section or group is displayed below the corresponding time group. Thus, the entire time series is converted into a series of symbolic values 510.

FIGS. 6A-6D are diagrams illustrating the process, in accordance with some example embodiments, of using symbolic values 512 to identify specific patterns in multiple sets of symbolic data 604 based on a received search query 602.

In this example, time series data has been converted to symbolic data 604. The computer system (e.g., the computer system 120 in FIG. 1) receives a search query 602. In some example embodiments, the search query 602 is originally received as plain text (e.g., not converted to symbolic form) and then converted into one or more symbolic values to be used for a search.

In some example embodiments, the computer system (e.g., the computer system 120 in FIG. 1) uses the converted search query and compares it to a plurality of symbolic time-series data sets stored symbolic data 604. In some example embodiments, the plurality of symbolic time-series data sets are independent but related to the same system. The computer system (e.g., the computer system 120 in FIG. 1) then identifies any sections of the plurality of symbolic time series data sets 606 that match the search query 602.

The example shown in FIG. 6B continues the example from FIG. 6A wherein additional symbolic characters are added to the search query 602. The computer system (e.g., the computer system 120 in FIG. 1) then continues searching the plurality of symbolic time series data sets 606 and only identifies sections of the plurality of symbolic time series data sets 608 that match the current search query 602.

The example in FIG. 6C shows the completed search query 602. The computer system (e.g., the computer system 120 in FIG. 1) finishes searching the symbolic data 604. The matching segments 610 of the plurality of symbolic time series data sets are identified and analyzed to determine whether the identified sections overlap in time. In this case, the server system (e.g., server system 120 in FIG. 1) identifies one section in each data set that overlap in a period of time 610. The computer system (e.g., the computer system 120 in FIG. 1) determines that a specific event matching the query has occurred in that period of time 610. In some example embodiments, the computer system (e.g., the computer system 120 in FIG. 1) returns the identified sections to the client system that sent the original search query.

Figure 6D:
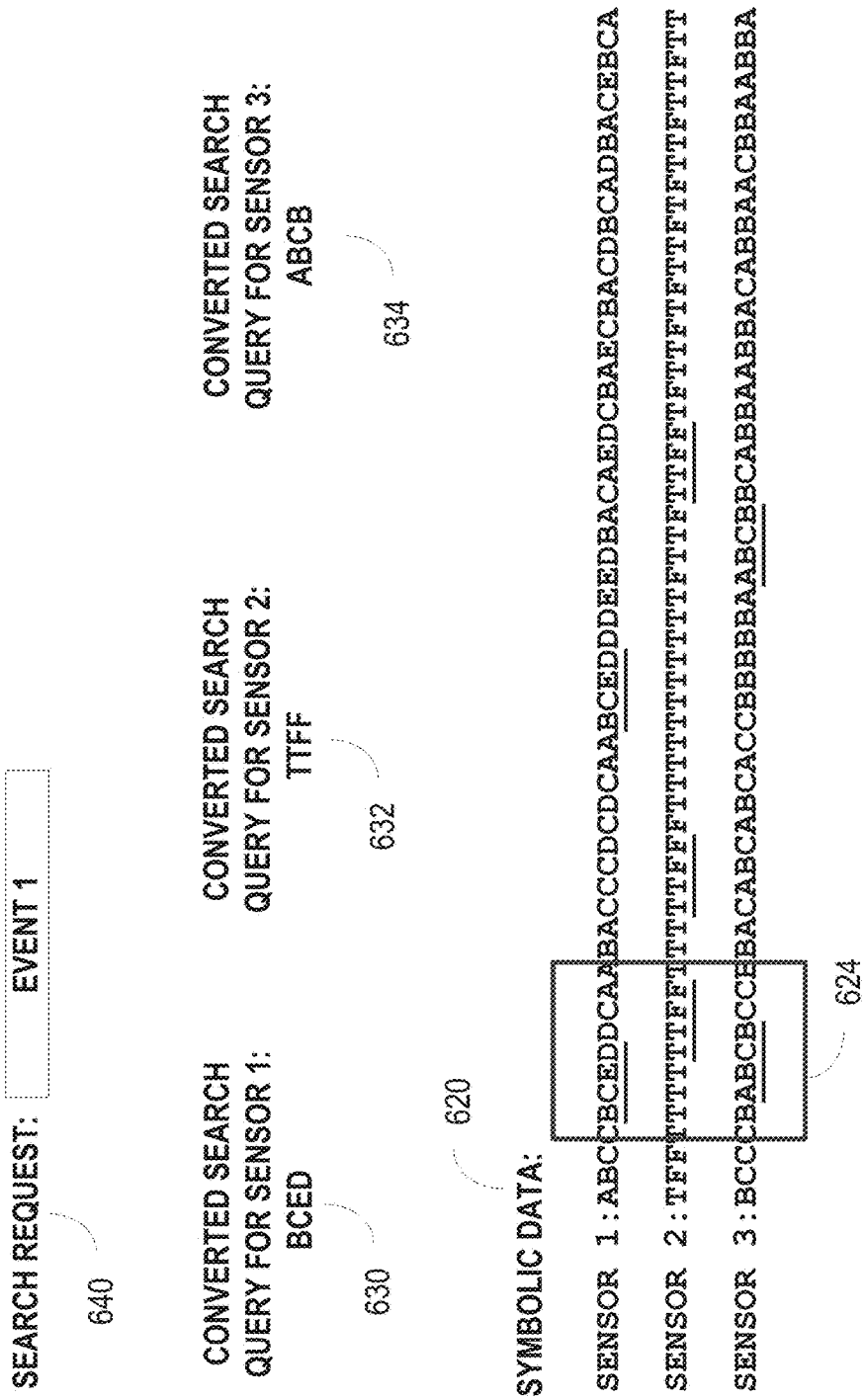

The example in FIG. 6D shows an example of converting a request to search 640 for a specific event into multiple different search queries for different time-series data sets from different sensors in the case where each time-series data set uses distinct symbolic values. In some example embodiments, the computer system (e.g., the computer system 120 in FIG. 1) receives a search request 640 that specifies a specific event (or event type) that should be found. The computer system (e.g., the computer system 120 in FIG. 1) determines that each time-series data set uses a distinct set of symbolic representation. As such, the search request 640 is converted into a plurality of different search queries based on the requested event to effectively search each distinct time-series data set.

Thus, in this case, the computer system (e.g., the computer system 120 in FIG. 1) produces a converted search query for the time-series data set associated with a first sensor 630, a converted search query for the time-series data set associated with a second sensor 632, and a converted search query for the time-series data set associated with a third sensor 634 all based on the event (or event type) requested by the search request 640. In some example embodiments, the computer system (e.g., the computer system 120 in FIG. 1) stores data describing the representative symbols for each time-series data set such that any search request that specifies an event can be converted to find matching event data in the time-series data set.

In some example embodiments, once the search request 640 has been converted, the computer system (e.g., the computer system 120 in FIG. 1) identifies the converted search query (or pattern) within each respective time series data set. In this case, the server system (e.g., server system 120 in FIG. 1) identifies one section in each data set that overlap in a period of time 624. The computer system (e.g., the computer system 120 in FIG. 1) determines that a specific event matching the query has occurred in that period of time 624. In some example embodiments, the computer system (e.g., the computer system 120 in FIG. 1) returns the identified sections to the client system that sent the original search query.

Figure 7A:
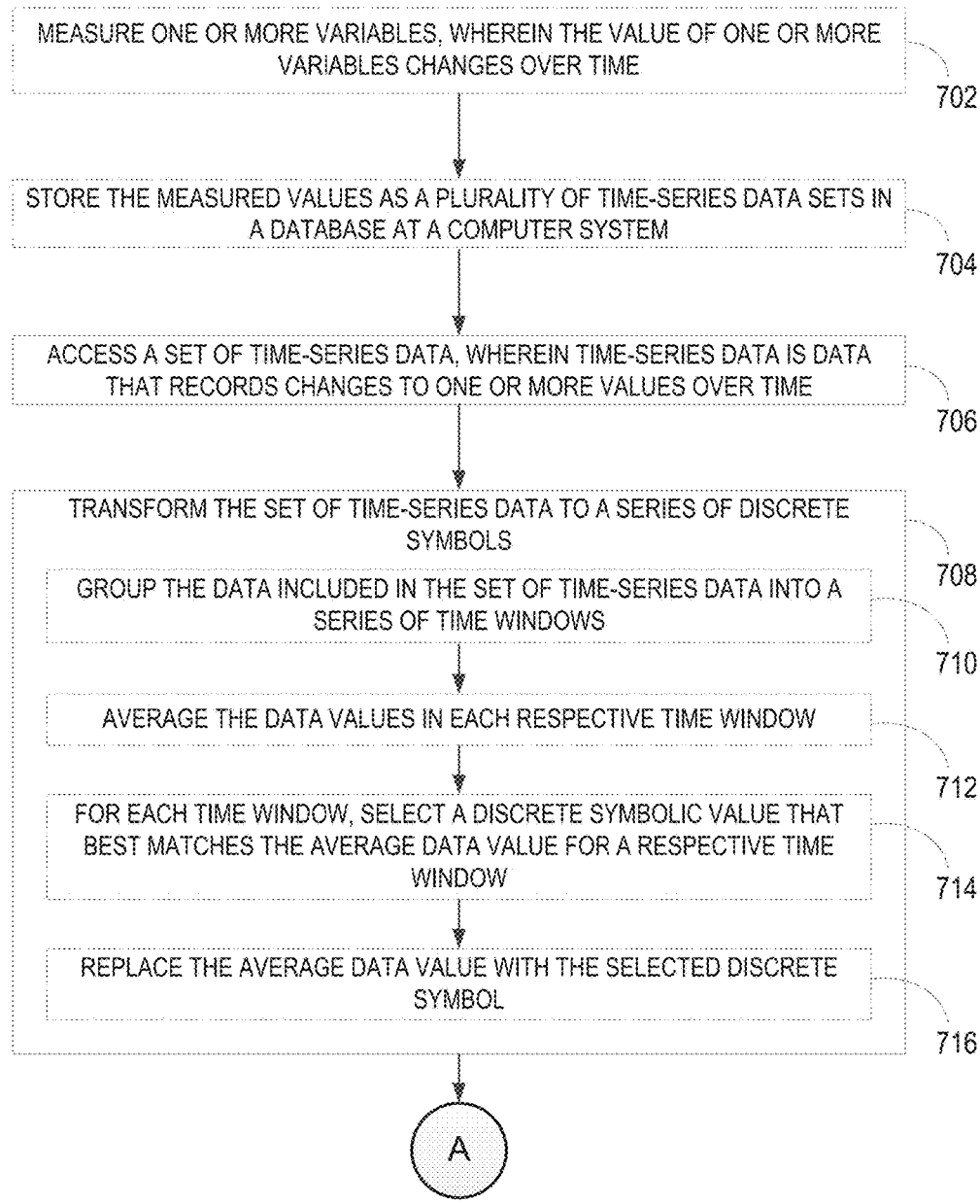
FIG. 7A is a flow diagram illustrating a method, in accordance with some example embodiments, for searching for and finding data across industrial time series data.

FIG. 7A is a flow diagram illustrating a method, in accordance with some example embodiments, for searching for and finding data across industrial time series data. Each of the operations shown in FIG. 7A may correspond to instructions stored in a computer memory 212 or computer-readable storage medium. Optional operations are indicated by dashed lines (e.g., boxes with dashed-line borders). In some embodiments, the method described in FIG. 7A is performed by the computer system (e.g., the computer system 120 in FIG. 1). However, the method described can also be performed by any other suitable configuration of electronic hardware.

In some embodiments, the method is performed at a computer system (e.g., the computer system 120 in FIG. 1) including one or more processors and memory 212 storing one or more programs for execution by the one or more processors.

In some example embodiments, the computer system (e.g., the computer system 120 in FIG. 1) measures (702) one or more variables associated with a system (e.g., an engine), wherein the value of one or more variables changes over time. For example, the computer system (e.g., the computer system 120 in FIG. 1) measures the temperature and rotations per minute of an engine over time.

In some example embodiments, the computer system (e.g., the computer system 120 in FIG. 1) stores (704) the measured values as a plurality of time series data sets 304 in a database at a computer system (e.g., the computer system 120 in FIG. 1). For example, if the computer system (e.g., the computer system 120 in FIG. 1) measures the temperature of an engine over time, the computer system (e.g., the computer system 120 in FIG. 1) stores the measured temperatures for each measurement in the order they are measured (along with the time of the measurement) in a database associated with the computer system (e.g., the computer system 120 in FIG. 1).

In some example embodiments, the plurality of time-series data sets 304 include two or more time-series data sets that are based on different variables associated with the same system. For example, a motor has two sensors (one measuring temperature and one measuring RPM) and as a result there are two distinct, but related, time-series data sets. Both time-series data sets are stored in the database associated with the computer system (e.g., the computer system 120 in FIG. 1) and included metadata indicating the system from which the time-series data was gathered.

In some example embodiments, the computer system (e.g., the computer system 120 in FIG. 1) accesses (706) a set of time-series data, wherein time-series data 304 is data that records changes to one or more values over time. For example, the computer system (e.g., the computer system 120 in FIG. 1) determines that a specific time-series set is needed and, as a result, the computer system (e.g., the computer system 120 in FIG. 1) retrieves the needed time-series data 304 from the database. In some example embodiments, the data conversion module 124 normalizes the data for each time-series data set.

In some example embodiments, the computer system (e.g., the computer system 120 in FIG. 1) transforms (708) the set of time-series data 304 to a series of discrete symbols. Thus, the computer system (e.g., the computer system 120 in FIG. 1) substitutes one or more symbols for each group of time-series data. For example, if the variable's value has a range between 0 and 1, then each 0.1 increment is associated with a specific letter (A-J). The values are then replaced by the associated letter.

In some example embodiments, the computer system (e.g., the computer system 120 in FIG. 1) groups (710) the data included in the set of time-series data 304 into a series of time windows. For example, if the time series data includes 24 hours of data, the data can be grouped into 60 second groups.

In some example embodiments, the computer system (e.g., the computer system 120 in FIG. 1) averages (712) the data values in each respective time window. For example, if the time series data is grouped into a plurality of 1 second groups, the computer system (e.g., the computer system 120 in FIG. 1) determines the aggregate (e.g., average) value for the time covered by the group. Thus, if the variable steadily and uniformly increases from 0.3 to 0.4 during the one second time frame, the average value is 0.35.

In some example embodiments, for each time window, the computer system (e.g., the computer system 120 in FIG. 1) selects (714) a discrete symbolic value 510 that best matches the aggregate data value for a respective time window. As in the above example, values for the time series data vary between 0 and 1.0. Thus, each time window determines a specific aggregate value. The aggregate value is then compared with the values associated with each symbolic value 510. Thus, if the value range (from 0 to 1.0) has been grouped into ten equally sized ranges, each associated with a letter from A to J, and the average value of a specific time window is 2.5, the assigned symbolic value 510 would be a 'B.'

In some example embodiments, the computer system (e.g., the computer system 120 in FIG. 1) replaces (716) the aggregate data value with the selected discrete symbol. Continuing the above example, the time window with the average value of 2.5 would be replaced with a symbolic value 510 of 'B'.

Figure 7B:
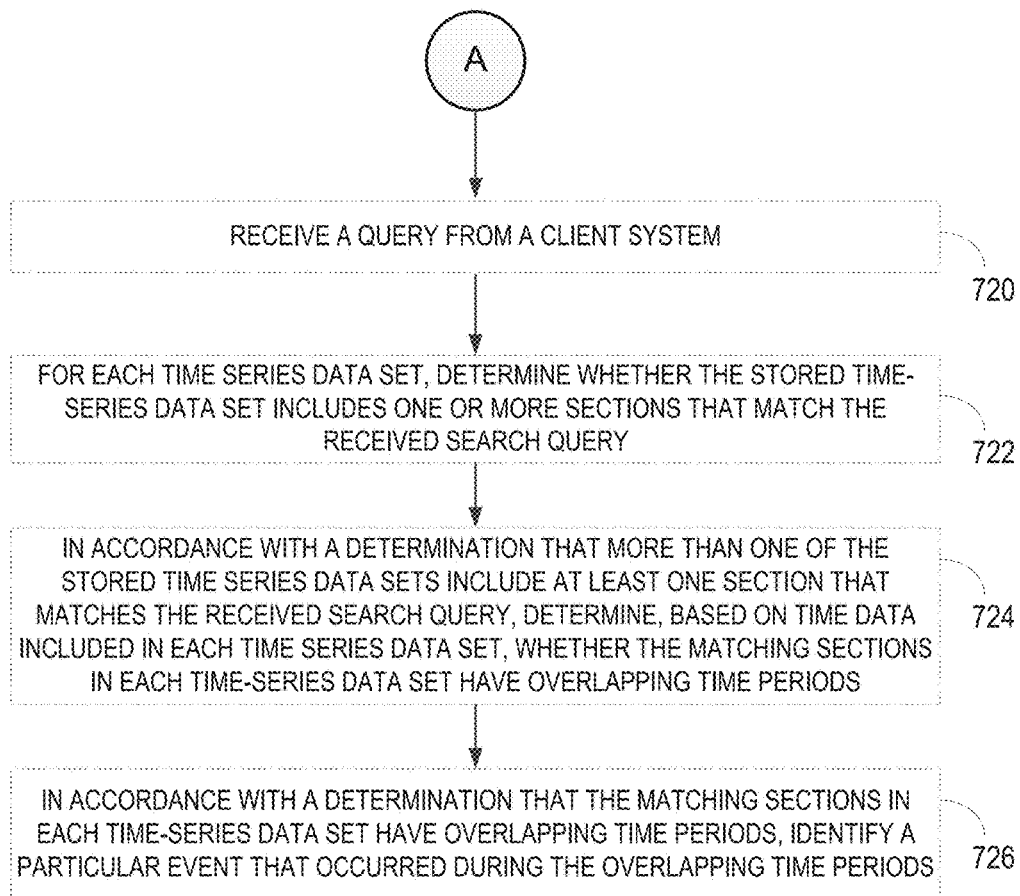
FIG. 7B is a flow diagram illustrating a method, in accordance with some example embodiments, for searching for and finding data across industrial time series data.

FIG. 7B is a flow diagram illustrating a method, in accordance with some example embodiments, for searching for and finding data across industrial time series data. Each of the operations shown in FIG. 7B may correspond to instructions stored in a computer memory 212 or computer-readable storage medium. Optional operations are indicated by dashed lines (e.g., boxes with dashed-line borders). In some embodiments, the method described in FIG. 7B is performed by the computer system (e.g., the computer system 120 in FIG. 1). However, the method described can also be performed by any other suitable configuration of electronic hardware.

In some embodiments, the method is performed at a computer system (e.g., the computer system 120 in FIG. 1) including one or more processors and memory 212 storing one or more programs for execution by the one or more processors.

In some example embodiments, the computer system (e.g., the computer system 120 in FIG. 1) receives (720) a query from a client system. In some example embodiments, the search query includes a search pattern to be matched against one or more time-series data sets. In some example embodiments, the search query includes data specifying the one or more time-series data sets that should be searched. For example, a search query includes the pattern ABFEDF as the search query pattern and indicates this pattern should be matched against time-series data set 2, time-series data set 3, and time-series data set 6 (e.g., thus only time-series data sets 2, 3, and 6 will be searched).

In some example embodiments, the search query specifies a system (e.g., a specific motor or set of motors) and a time frame and the computer system (e.g., the computer system 120 in FIG. 1) identifies all the time-series data sets associated with that system and then selects only the data for the time frame requested. For example, the query indicates that the search should cover all the time-series data sets gathered from data center D1 from March 1 to March 31. The computer system (e.g., the computer system 120 in FIG. 1) then identifies all the time-series data sets that match those criteria.

In another example, a client system (or other source) sends a search query 602 to the computer system (e.g., the computer system 120 in FIG. 1). The query specifies a specific engine and the month of April. The computer system (e.g., the computer system 120 in FIG. 1) then identifies all the time-series data sets associated with the specified data center and then retrieves all data from the month of April. In some example embodiments, the received query is received as plain text. For example, the search query 602 is something like, "find situations where the temperature rapidly increases and then slowly cools off."

In some example embodiments, the computer system (e.g., the computer system 120 in FIG. 1) modifies the received query plain text to a series of discrete symbols. For example, the computer system (e.g., the computer system 120 in FIG. 1) uses the same rules for converting time-series data 304 to symbolic form to convert the plain-text query to a symbolic form.

In some example embodiments, the received query is received as a symbolic data pattern. For example, the search query 602 can be already in the symbolic notation used in the database. The search query 602 is "ABCD". In other example embodiments, the search query 602 represents a pattern and is used for pattern matching, such as regular expressions. For example, the search query 602 is the pattern A*B*C*D* where * indicates that the preceding letter can be repeated a variable number of times.

In some example embodiments, the computer system 120 identifies (722) one or more portions of the plurality of time-series data sets that match the received query. For example, the computer system (e.g., the computer system 120 in FIG. 1) matches the symbols in the search query 602 and searches for the same repeating patterns in the symbolic data sets 604 stored in the database. Identifying one or more portions of the plurality of time-series data sets that match the received query further comprises matching the received symbolic data pattern to the stored symbolic data 604.

In some example embodiments, once the computer system (e.g., the computer system 120 in FIG. 1) identifies one or more matching sections of data in each (or at least some of) the plurality of time-series data sets, the computer system (e.g., the computer system 120 in FIG. 1), for each stored time series data set, determines (722) whether the stored time-series data set includes one or more sections that match the received search query. This is accomplished by using pattern matching to find sections of the stored time-series data set that match the search query (or the converted, normalized search pattern).

In accordance with a determination that more than one of the stored time-series data sets include at least one section that matches the received search query, the computer system (e.g., the computer system 120 in FIG. 1) determines (724), based on time data included in each time series data set, whether the matching sections in each time-series data set have overlapping time periods.

For example, if the computer system (e.g., the computer system 120 in FIG. 1) finds matching sections in four related time series data sets, the computer system (e.g., the computer system 120 in FIG. 1) then determines a time period for each matching section. If the time period for all four sections is overlapping or is very close to overlapping, the computer system (e.g., the computer system 120 in FIG. 1)

determines that the matching sections in each time-series data set have overlapping time periods.

In accordance with a determination that the plurality of time-series data sets have identified matching sections, the computer system (e.g., the computer system 120 in FIG. 1) determines (726) that the overlapping matching data sections indicate a common event (e.g., an event that occurred at the system that each of the plurality is associated with).

For example, the search query is a pattern that represents the start-up of Motor System A. The computer system (e.g., the computer system 120 in FIG. 1) searches each time-series data set associated with Motor System A for time-series data that matches the query associated with a motor start up. In some example embodiments, the computer system (e.g., the computer system 120 in FIG. 1) identifies one or more matching sections in each time-series data set. The computer system (e.g., the computer system 120 in FIG. 1) then determines whether the matching sections in the different time-series data sets overlap in time. If so, the computer system (e.g., the computer system 120 in FIG. 1) determines that the time period in which the matching sections are found was the time period in which a startup of Motor System A occurred.

Software Architecture

Figure 8:
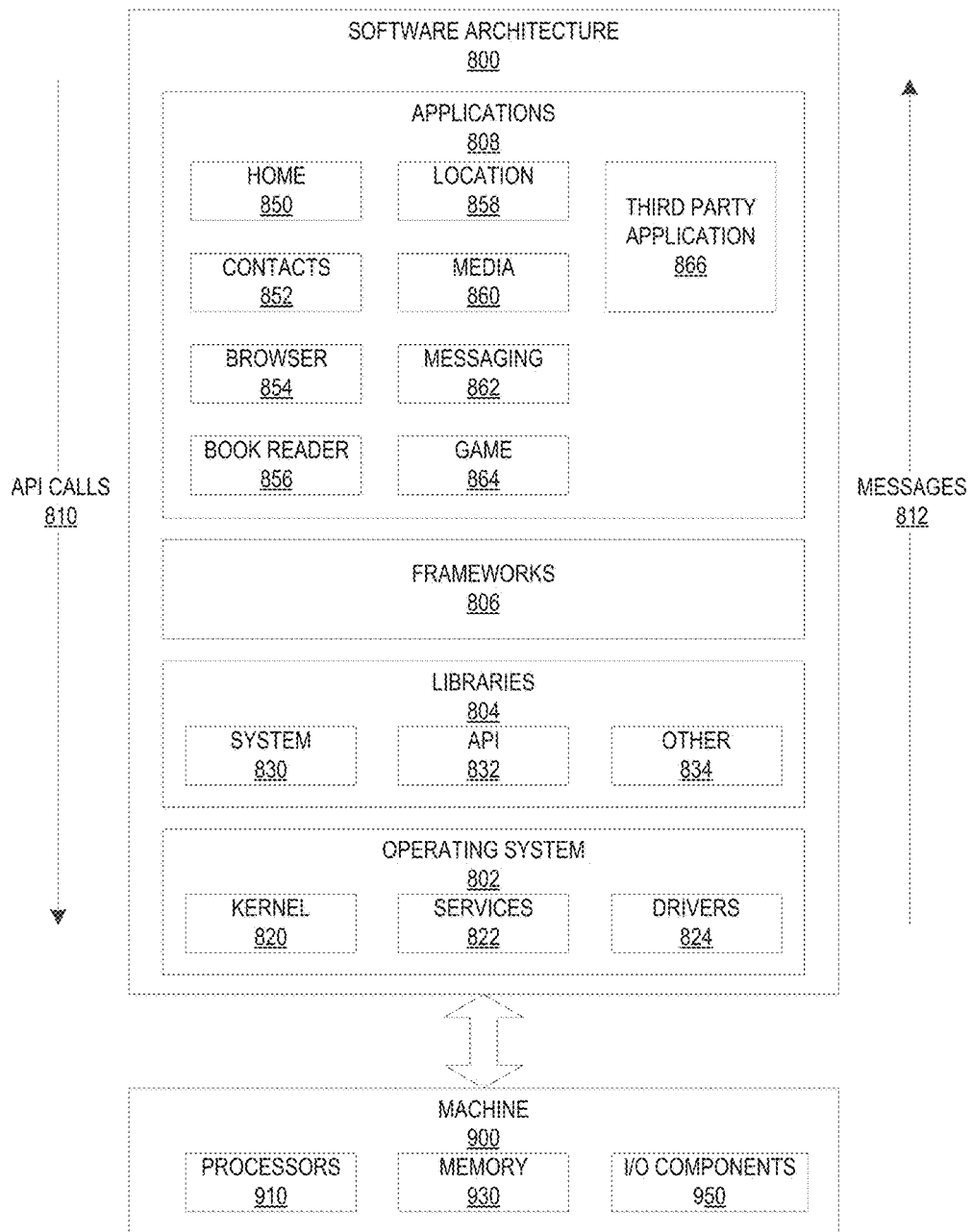
FIG. 8 is a block diagram illustrating an architecture of software, in accordance with an example embodiment, which may be installed on any one or more devices.

FIG. 8 is a block diagram illustrating an architecture of software 800, in accordance with an example embodiment, which may be installed on any one or more of the devices of FIG. 1 (e e.g., the computer system 120 in FIG. 1). FIG. 8 is merely a non-limiting example of a software architecture 800 and it will be appreciated that many other architectures may be implemented to facilitate the functionality described herein. The software 800 may be executing on hardware such as a machine 900 of FIG. 9 that includes processors 910, memory 930, and I/O components 950. In the example architecture of FIG. 8, the software 800 may be conceptualized as a stack of layers where each layer may provide particular functionality. For example, the software 800 may include layers such as an operating system 802, libraries 804, frameworks 806, and applications 808. Operationally, the applications 808 may invoke application programming interface (API) calls 810 through the software stack and receive messages 812 in response to the API calls 810.

The operating system 802 may manage hardware resources and provide common services. The operating system 802 may include, for example, a kernel 820, services 822, and drivers 824. The kernel 820 may act as an abstraction layer between the hardware and the other software layers. For example, the kernel 820 may be responsible for memory management, processor management (e.g., scheduling), component management, networking, security settings, and so on. The services 822 may provide other common services for the other software layers. The drivers 824 may be responsible for controlling and/or interfacing with the underlying hardware. For instance, the drivers 824 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth.

The libraries 804 may provide a low-level common infrastructure that may be utilized by the applications 808. The libraries 804 may include system libraries (e.g., C standard library) 830 that may provide functions such as memory allocation functions, string manipulation functions, mathematic functions, and the like. In addition, the libraries 804 may include API libraries 832 such as media libraries (e.g., libraries to support presentation and manipulation of various media formats, such as MPEG4, H.264, MP3, AAC, AMR, JPG, or PNG), graphics libraries (e.g., an OpenGL framework that may be used to render 2D and 3D in a graphic content on a display 206), database libraries (e.g., SQLite that may provide various relational database functions), web libraries (e.g., WebKit that may provide web browsing functionality), and the like. The libraries 804 may also include a wide variety of other libraries 834 to provide many other APIs to the applications 808.

The frameworks 806 may provide a high-level common infrastructure that may be utilized by the applications 808. For example, the frameworks 806 may provide various graphic user interface (GUI) functions, high-level resource management, high-level location services, and so forth. The frameworks 806 may provide a broad spectrum of other APIs that may be utilized by the applications 808, some of which may be specific to a particular operating system 802 or platform.

The applications 808 include a home application 850, a contacts application 852, a browser application 854, a book reader application 856, a location application 858, a media application 860, a messaging application 862, a game application 864, and a broad assortment of other applications, such as a third party application 866. In a specific example, the third party application 866 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 866 may invoke the API calls 810 provided by the operating system 802 to facilitate functionality described herein.

Example Machine Architecture and
Machine-Readable Medium

Figure 9:
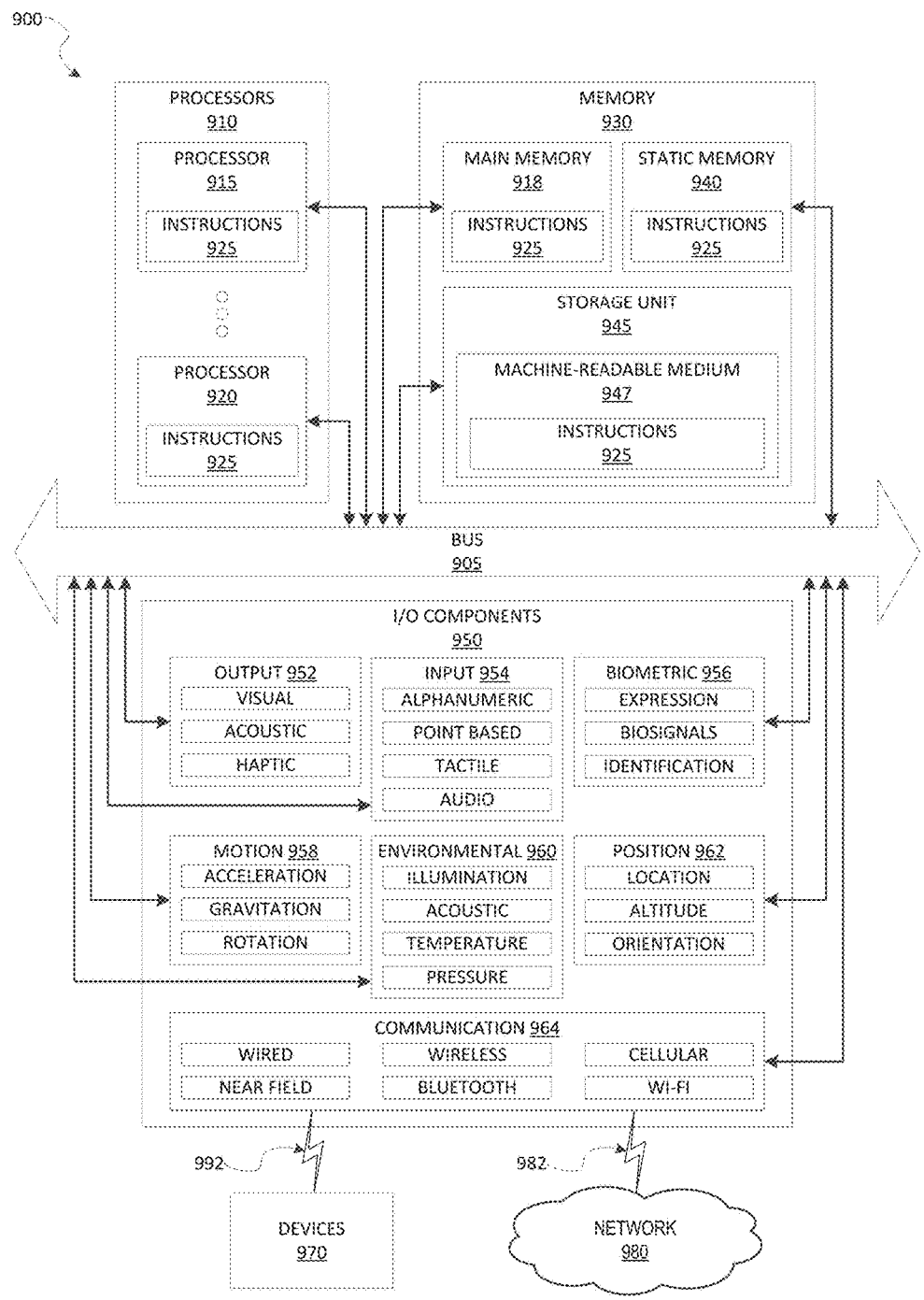
FIG. 9 is a block diagram illustrating components of a machine, in accordance with an example embodiment.

FIG. 9 is a block diagram illustrating components of a machine 900, according to some example embodiments, able to read instructions from a machine-readable medium (e.g., a machine-readable storage medium) and perform any one or more of the methodologies discussed herein. Specifically, FIG. 9 shows a diagrammatic representation of the machine 900 in the example form of a computer system 120, within which instructions 925 (e.g., software 800, a program, an application 808, an applet, an app, or other executable code) for causing the machine 900 to perform any one or more of the methodologies discussed herein may be executed. In alternative embodiments, the machine 900 operates as a stand-alone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 925, sequentially or otherwise, that specify actions to be taken by the machine 900. Further, while only a single machine 900 is illustrated, the term "machine" shall also be taken to include a collection of machines 900 that individually or jointly execute the instructions 925 to perform any one or more of the methodologies discussed herein.

The machine 900 may include processors 910, memory 930, and I/O components 950, which may be configured to communicate with each other via a bus 905. In an example embodiment, the processors 910 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, a processor 915 and a processor 920 that may execute instructions 925. The term "processor" is intended to include multi-core processors 910 that may comprise two or more independent processors 915, 920 (also referred to as "cores") that may execute instructions 925 contemporaneously. Although FIG. 9 shows multiple processors 915, 920, the machine 900 may include a single processor 915 with a single core, a single processor 910 with multiple cores (e.g., a multi-core processor), multiple processors 915, 920 with a single core, multiple processors 915, 920 with multiples cores, or any combination thereof.

The memory 930 may include a main memory 918, a static memory 940, and a storage unit 945 accessible to the processors 910 via the bus 905. The storage unit 945 may include a machine-readable medium 947 on which are stored the instructions 925 embodying any one or more of the methodologies or functions described herein. The instructions 925 may also reside, completely or at least partially, within the main memory 918, within the static memory 940, within at least one of the processors 910 (e.g., within the processor's cache memory), or any suitable combination thereof, during execution thereof by the machine 900. Accordingly, the main memory 918, the static memory 940, and the processors 910 may be considered machine-readable media 947.

As used herein, the term "memory" refers to a machine-readable medium 947 able to store data temporarily or permanently, and may be taken to include, but not be limited to, random-access memory (RAM), read-only memory (ROM), buffer memory, flash memory, and cache memory. While the machine-readable medium 947 is shown in an example embodiment to be a single medium, the term "machine-readable medium" should be taken to include a single medium or multiple media (e.g., a centralized or distributed database, or associated caches and servers) able to store instructions 925. The term "machine-readable medium" shall also be taken to include any medium, or combination of multiple media, that is capable of storing instructions (e.g., the instructions 925) for execution by a machine (e.g., the machine 900), such that the instructions 925, when executed by one or more processors of the machine 900 (e.g., the processors 910), cause the machine 900 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 950 may include a wide variety of components to receive input, provide and/or produce output, transmit information, exchange information, capture measurements, and so on. It will be appreciated that the I/O components 950 may include many other components that are not shown in FIG. 9. In various example embodiments, the I/O components 950 may include output components 952 and/or input components 954. The output components 952 may include visual components (e.g., a display 206 such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 954 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, and/or another pointing instrument), tactile input components (e.g., a physical button, a touch screen that provides location and force of touches or touch gestures, and/or other tactile input components), audio input components (e.g., a microphone), and the like.

In further example embodiments, the I/O components 950 may include biometric components 956, motion components 958, environmental components 960, and/or position components 962, among a wide array of other components. For example, the biometric components 656 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, finger print identification, or electroencephalogram based identification), and the like. The motion components 958 may include acceleration sensor components (e.g., accelerometer), gravitation sensor components, rotation sensor components (e.g., gyroscope), and so forth. The environmental components 960 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), and/or other components that may provide indications, measurements, and/or signals corresponding to a surrounding physical environment. The position components 962 may include location sensor components (e.g., a Global Position System (GPS) receiver component), altitude sensor components (e.g., altimeters and/or barometers that detect air pressure, from which altitude may be derived), orientation sensor components (e.g., magnetometers), and the like.

Communication may be implemented using a wide variety of technologies. The I/O components 950 may include communication components 964 operable to couple the machine 900 to a network 980 and/or to devices 970 via a coupling 982 and a coupling 992 respectively. For example, the communication components 964 may include a network interface component or another suitable device to interface with the network 980. In further examples, communication components 964 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 970 may be another machine 900 and/or any of a wide variety of peripheral devices (e.g., a peripheral device coupled via a Universal Serial Bus (USB)).

Moreover, the communication components 964 may detect identifiers and/or include components operable to detect identifiers. For example, the communication components 964 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF48, Ultra Code, UCC RSS-2D bar code, and other optical codes), acoustic detection components (e.g., microphones to identify tagged audio signals), and so on. In additional, a variety of information may be derived via the communication components 964, such as location via Internet Protocol (IP) geo-location, location via Wi-Fi® signal triangulation, location via detecting an NFC beacon signal that may indicate a particular location, and so forth.

Transmission Medium

In various example embodiments, one or more portions of the network 980 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 980 or a portion of the network 980 may include a wireless or cellular network and the coupling 982 may be a Code Division Multiple Access (CDMA) connection, a Global System for Mobile communications (GSM) connection, or another type of cellular or wireless coupling. In this example, the coupling 982 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 925 may be transmitted and/or received over the network 980 using a transmission medium via a network interface device (e.g., a network interface component included in the communication components 964) and utilizing any one of a number of well-known transfer protocols (e.g., hypertext transfer protocol (HTTP)). Similarly, the instructions 925 may be transmitted and/or received using a transmission medium via the coupling 992 (e.g., a peer-to-peer coupling) to the devices 970. The term "transmission medium" shall be taken to include any intangible medium that is capable of storing, encoding, or carrying the instructions 925 for execution by the machine 900, and includes digital or analog communications signals or other intangible media to facilitate communication of such software.

Furthermore, the machine-readable medium 947 is non-transitory (in other words, not having any transitory signals) in that it does not embody a propagating signal. However, labeling the machine-readable medium 947 "non-transitory" should not be construed to mean that the medium is incapable of movement; the medium should be considered as being transportable from one physical location to another. Additionally, since the machine-readable medium 947 is tangible, the medium may be considered to be a machine-readable device.

Term Usage

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The foregoing description, for purpose of explanation, has been described with reference to specific embodiments. However, the illustrative discussions above are not intended to be exhaustive or to limit the possible embodiments to the precise forms disclosed. Many modifications and variations are possible in view of the above teachings. The embodiments were chosen and described in order to best explain the principles involved and their practical applications, to thereby enable others skilled in the art to best utilize the various embodiments with various modifications as are suited to the particular use contemplated.

It will also be understood that, although the terms "first," "second," etc. may be used herein to describe various elements, these elements should not be limited by these terms. These terms are only used to distinguish one element from another. For example, a "first contact" could be termed a "second contact," and, similarly, a "second contact" could be termed a "first contact," without departing from the scope of the present embodiments. The first contact and the second contact are both contacts, but they are not the same contact.

The terminology used in the description of the embodiments herein is for the purpose of describing particular embodiments only and is not intended to be limiting. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if (a stated condition or event) is detected" may be construed to mean "upon determining (the stated condition or event)" or "in response to determining (the stated condition or event)" or "upon detecting (the stated condition or event)" or "in response to detecting (the stated condition or event)," depending on the context.

This written description uses examples to disclose the invention, including the best mode, and also to enable any person skilled in the art to practice the invention, including making and using any devices or systems and performing any incorporated methods. The patentable scope of the example embodiments are defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method comprising:
   receiving, using one or more hardware processors, a search query;
   accessing, using one or more hardware processors, a database including a plurality of stored time-series data sets associated with a computer system, wherein the plurality of stored time-series data sets represent different tracking variables from each other;
   producing, using one or more hardware processors, transformed time-series data sets by transforming each stored time-series data set to a series of discrete symbols, wherein transforming the set of time-series data set to a series of discrete symbols further comprises:
   grouping the data included in the set of time-series data set into a series of time windows;
   averaging the data values in each respective time window;
   for each time window, selecting a discrete symbol that best matches the average data value for a respective time window; and
   replacing the average data value with the selected discrete symbol;
   for each stored time-series data set, determining, using one or more hardware processors, whether the stored time-series data set includes one or more sections that match the received search query by matching a symbolic data pattern of the search query to the series of discrete symbols transformed from the sets of time-series data sets;
   in accordance with a determination that two or more of the stored time-series data sets include at least one section that matches the received search query, determining, using one or more hardware processors, whether the matching sections in each stored time-series data set have overlapping time periods based on time data included in each stored time-series data set; and
   in accordance with a determination that the matching sections in each time-series data set have overlapping time periods, identifying, using one or more hardware processors, a particular event that occurred during the overlapping time periods.

2. The method of claim 1, further comprising normalizing, using one or more hardware processors, the time-series data set in each stored time-series set.

3. The method of claim 1, wherein two or more of the time-series data sets represent different measurements of the same system over the same time period.

4. The method of claim 1, wherein each time window represents a fixed amount of time.

5. The method of claim 1, wherein the received query is received as plain text.

6. The method of claim 1, wherein the received query is received as the symbolic data pattern.

7. The method of claim 6, wherein identifying one or more portions of the transformed time-series data set that match the received query further comprises matching the received symbolic data pattern to the transformed time-series data sets.

8. The method of claim of claim 5, further comprising modifying, using one or more hardware processors, the received query plain text to the symbolic data pattern, the symbolic data pattern comprising a series of discrete symbols.

9. An electronic device comprising:
   a reception module, using at least one processor of a machine, to receive a search query from a client system;

an accessing module, using at least one processor of a machine, to access a database including a plurality of stored time-series data sets associated with a computer system, wherein the plurality of stored time-series data sets represent different tracking variables from each other;

a transformation module, using at least one processor of a machine, to produce transformed time-series data sets by transforming each stored set of time-series data set to a series of discrete symbols;

a determination module, using at least one processor of a machine, to, for each stored time-series data set, determine whether the stored time-series data set includes one or more sections that match the received search query by matching a symbolic data pattern of the search query to the series of discrete symbols transformed from the sets of time-series data sets, wherein transforming the set of time-series data set to a series of discrete symbols further comprises:

grouping the data included in the set of time-series data set into a series of time windows;

averaging the data values in each respective time window;

for each time window, selecting a discrete symbol that best matches the average data value for a respective time window; and replacing the average data value with the selected discrete symbol;

a matching module, using at least one processor of a machine, to, in accordance with a determination that two or more of the stored time-series data sets include at least one section that matches the received search query, determine whether the matching sections in each stored time-series data set have overlapping time periods based on time data included in each stored time-series data set; and an identification module, using at least one processor of a machine, to, in accordance with a determination that the matching sections in each time-series data set have overlapping time periods, identify a particular event that occurred during the overlapping time periods.

10. The system of claim 9, further comprising a normalization module, using at least one processor of a machine, to normalize the time-series data set in each stored time-series data set.

11. The system of claim 9, wherein two or more of the time-series data sets represent different measurements of the same system over the same time period.

12. The system of claim 9, wherein the received query is received as plain text.

13. A non-transitory computer-readable storage medium storing instructions that, when executed by the one or more processors of a machine, cause the machine to perform operations comprising:

receiving a search query;

accessing a database including a plurality of stored time-series data sets associated with a computer system, wherein the plurality of stored time-series data sets represent different tracking variables from each other;

producing transformed time-series data sets by transforming each stored time-series data set to a series of discrete symbols, wherein transforming the set of time-series data set to a series of discrete symbols further comprises:

grouping the data included in the set of time-series data set into a series of time windows;

averaging the data values in each respective time window;

for each time window, selecting a discrete symbol that best matches the average data value for a respective time window; and replacing the average data value with the selected discrete symbol;

for each stored time-series data set, determining, using one or more hardware processors, whether the stored time-series data set includes one or more sections that match the received search query by matching a symbolic data pattern of the search query to the series of discrete symbols transformed from the sets of time-series data sets;

in accordance with a determination that two or more of the stored time-series data sets include at least one section that matches the received search query, determining whether the matching sections in each stored time-series data set have overlapping time periods based on time data included in each stored time-series data set; and in accordance with a determination that the matching sections in each time-series data set have overlapping time periods, identifying a particular event that occurred during the overlapping time periods.

14. The non-transitory computer-readable storage medium of claim 13, further comprising normalizing the time-series data set in each time-series set.

15. The non-transitory computer-readable storage medium of claim 13, wherein two or more of the time-series data sets represent different measurements of the same system over the same time period.

* * * * *